US010965471B2

(12) United States Patent
Kodera et al.

(10) Patent No.: US 10,965,471 B2
(45) Date of Patent: Mar. 30, 2021

(54) INFORMATION MANAGEMENT DEVICE TO SET EXPIRATION DATES OF BLOOM FILTERS

(71) Applicant: KABUSHIKI KAISHA TOSHIBA, Minato-ku (JP)

(72) Inventors: Shiho Kodera, Yokohama (JP); Keisuke Minami, Kawasaki (JP); Daisuke Ajitomi, Setagaya (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 261 days.

(21) Appl. No.: 16/129,284

(22) Filed: Sep. 12, 2018

(65) Prior Publication Data
US 2019/0280882 A1 Sep. 12, 2019

(30) Foreign Application Priority Data
Mar. 7, 2018 (JP) .............................. JP2018-040775

(51) Int. Cl.
*H04L 9/32* (2006.01)
*H04L 29/06* (2006.01)
(Continued)

(52) U.S. Cl.
CPC ............ *H04L 9/3268* (2013.01); *G06F 21/44* (2013.01); *G06F 21/45* (2013.01);
(Continued)

(58) Field of Classification Search
CPC ... H04L 9/3268; H04L 63/0853; H04L 63/20; H04L 63/12; H04L 63/0823; G06F 21/45; G06F 21/44; G06F 21/33
See application file for complete search history.

(56) References Cited

U.S. PATENT DOCUMENTS 5,687,235 A * 11/1997 Perlman ................ H04L 9/3268
380/30
6,134,551 A * 10/2000 Aucsmith ............... G06F 21/34
(Continued)

FOREIGN PATENT DOCUMENTS

| JP | 2002-163395 A | 6/2002 |
| JP | 2014-241528 A | 12/2014 |
| JP | 6034754 | 11/2016 |

OTHER PUBLICATIONS

Larisch, James et al., "CRLite: A Scalable System for Pushing All TLS Revocations to All Browsers", 2017 IEEE Symposium on Security and Privacy, pp. 539-556. (Year: 2017).*
(Continued)

*Primary Examiner* — Michael Pyzocha
(74) *Attorney, Agent, or Firm* — Oblon, McClelland, Maier & Neustadt, L.L.P.

(57) ABSTRACT

According to one embodiment, an information management device includes a Bloom filter generator configured to generate a Bloom filter based on information on a revoked certificate; a data distributor configured to send the Bloom filter to an authentication device, the authentication device authenticates a device with a certificate provided by the device; and an examiner configured to determine, when an examination request is received from the authentication device, whether an certificate designated by the examination request has been revoked based on revocation management information that contains information on the revoked certificate, and to send an examination result indicating whether the designated certificate has been revoked to the authentication device.

10 Claims, 8 Drawing Sheets

(51) Int. Cl.
G06F 21/44 (2013.01)
G06F 21/45 (2013.01)
(52) U.S. Cl.
CPC ......... *H04L 63/0853* (2013.01); *H04L 63/12* (2013.01); *H04L 63/20* (2013.01)

(56) References Cited

U.S. PATENT DOCUMENTS

| | | | | |
|---|---|---|---|---|
| 9,641,343 | B1* | 5/2017 | Roskind | H04L 9/3268 |
| 2012/0072720 | A1* | 3/2012 | Rescorla | H04L 63/0823 |
| | | | | 713/158 |
| 2013/0238897 | A1* | 9/2013 | Mashatan | H04L 63/20 |
| | | | | 713/158 |
| 2014/0373118 | A1 | 12/2014 | Doi et al. | |
| 2017/0250825 | A1* | 8/2017 | Hokiyama | H04L 63/0428 |
| 2018/0262347 | A1* | 9/2018 | Levy | H04L 9/3247 |

OTHER PUBLICATIONS

Mahmoud, Mohamed et al., "An Efficient Certificate Revocation Scheme for Large-Scale AMI Networks", 2014 IEEE, pp. 1-8. (Year: 2014).*

Rabieh, Khaled et al., "Scalable Certificate Revocation Schemes for Smart Grid AMI Networks Using Bloom Filters", IEEE Transactions on Dependable and Secure Computing, vol. 14, No. 4, Jul./Aug. 2017, pp. 420-432. (Year: 2017).*

D. Cooper, et al, "Internet X. 509 Public Key Infrastructure Certificate and Certificate Revocation List (CRL) Profile", RFC 5280, Standards Track, May 2008, 151 pages.

* cited by examiner

| CERTIFICATE | REVOKED OR NOT |
|---|---|
| C1 | REVOKED |
| C9 | VALID |
| C31 | REVOKED |
| C71 | VALID |
| . . . | . . . |

| | VALIDITY PERIOD OF BLOOM FILTER (COINCIDING WITH VALIDITY PERIOD OF LATEST CERTIFICATE) | BLOOM FILTER |
|---|---|---|
| 1 | 2017.07.01~2017.08.31 | BF1 |
| 2 | 2017.05.01~2017.07.01 | BF2 |
| 3 | 2017.08.01~2017.10.30 | BF3 |
| 4 | : | : |

INFORMATION MANAGEMENT DEVICE TO SET EXPIRATION DATES OF BLOOM FILTERS

CROSS REFERENCE TO RELATED APPLICATIONS

This application is based upon and claims the benefit of priority from the prior Japanese Patent Application No. 2018-040775, filed on Mar. 7, 2018, the entire contents of which are incorporated herein by reference.

FIELD

Embodiments of the present invention relate to an information management device, an authentication device, an information management system, an information management method, and a non-transitory computer readable medium.

BACKGROUND

Conventionally, there is a verification server that checks whether or not a certificate has been revoked each time an authentication server requests to verify validity of the certificate. A problem with the verification server is that as the number of certificates to be verified increases, a communication load between the authentication server and the verification server increases.

Moreover, there is a technique in which a Bloom filter is generated from a list of revoked certificates (revocation list) and distributed to an authentication server. In this case, the Bloom filter is used to verify whether or not a certificate has been revoked. Due to characteristics of a Bloom filter, a false positive is possible in which it is determined that a certificate has been revoked even though the certificate has actually not been revoked. To prevent occurrence of a false positive, each time a revoked certificate is added to a Bloom filter, it is verified whether or not any certificate resulting in a false positive arises. When such a certificate arises, another certificate that does not result in a false positive is reissued. This causes a problem that a processing cost increases.

SUMMARY

According to one embodiment, an information management device includes a Bloom filter generator configured to generate a Bloom filter based on information on a revoked certificate; a data distributor configured to send the Bloom filter to an authentication device, the authentication device authenticates a device with a certificate provided by the device; and an examiner configured to determine, when an examination request is received from the authentication device, whether an certificate designated by the examination request has been revoked based on revocation management information that contains information on the revoked certificate, and to send an examination result indicating whether the designated certificate has been revoked to the authentication device.

BRIEF DESCRIPTION OF THE DRAWINGS

FIG. 7 is a diagram showing an example of a table in which a plurality of Bloom filters are associated with terms of validity thereof;

DETAILED DESCRIPTION

Figure 1:
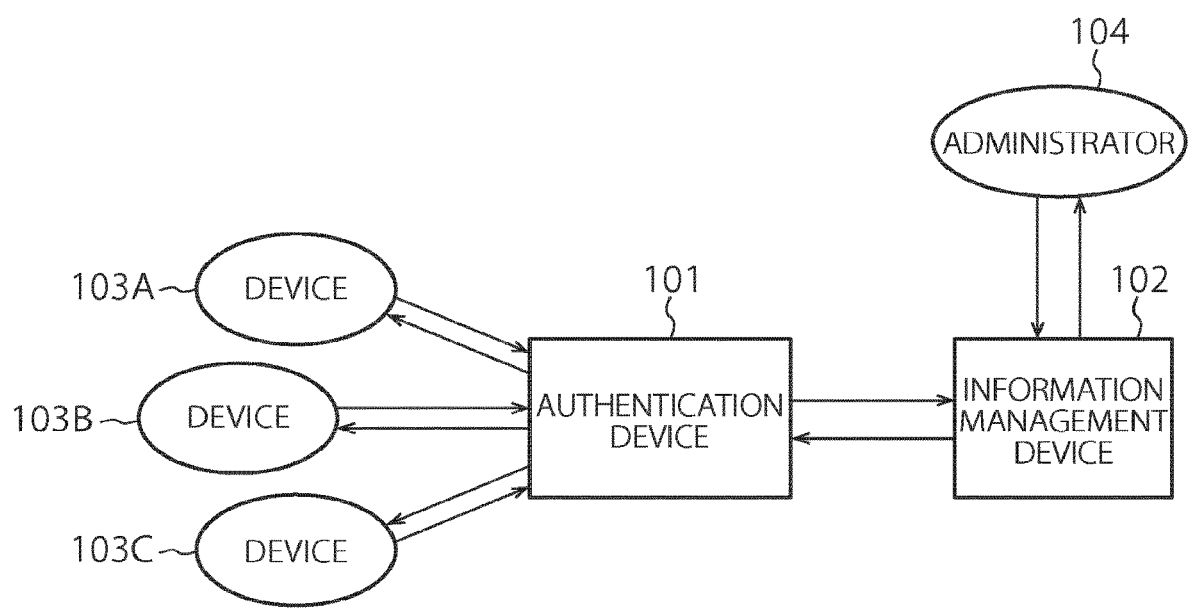
FIG. 1 is a schematic diagram of an example of an information management system according to an embodiment.

Hereinafter, embodiments of the present invention will be described with reference to drawings. Throughout the drawings, elements with like names are denoted by like reference numerals, and a description of elements denoted by like reference numerals will be omitted appropriately, except extended or changed functions.

First Embodiment

FIG. 1 is a schematic diagram of an overall information management system according to the present embodiment. The information management system includes devices 103A, 103B and 103C, an authentication device 101 that authenticates the devices by using a certificate presented by each device, an information management device (server device) 102, and an administrator terminal 104.

A certificate is issued by a certificate issuance server (not shown). As an example, a certificate is a byte string or a bit string computed by the certificate issuance server using a predetermined algorithm based on random numbers generated by a random number generator. A certificate may include information for identifying the certificate, such as a serial number or a DN (Distinguished Name). The information management device 102 may include functionality of the certificate issuance server. When authentication succeeds, a device can participate in a device network system including trusted devices and communicate with the other devices and a server within the device network system. Hereinafter, the information management system shown in FIG. 1 will be described.

Each device and the authentication device 101, the authentication device 101 and the information management device 102, and the information management device 102 and the administrator terminal 104 are connected to each other through communication networks, respectively. The communication networks may be different networks, or all or part of the communication networks may be the same network. The communication networks may be local area networks, or may be wide area networks typified by the Internet. Further, the communication networks may be wired networks or wireless networks, or may be networks including both a wired network and a wireless network.

The administrator terminal 104 receives a designation of a certificate to be revoked from an administrator. The administrator has authority to revoke a certificate. For example, a certificate is revoked in case where a user of a device having the certificate thereon has lost the device. As another example, a certificate is issued for a temporary use and revoked after the temporary use has completed. The administrator designates a certificate to revoke by using an input device of the administrator terminal 104. The designation may be performed by using information for specifying the certificate such as, for example, a serial number of the certificate, or by inputting a copy of the certificate. The administrator terminal 104 sends a certificate revocation request (hereinafter, revocation request) including the designated certificate to the information management device 102.

The information management device 102 revokes the certificate designated by the revocation request from the administrator terminal 104. The information management device 102 manages hitherto revoked certificates as a revocation list. The revocation list contains information on the revoked certificates (the information may be a serial number, a combination of a serial number and a DN, a certificate itself, or any other information; hereinafter the same applies). The revocation list is an example of revocation management information that contains information on the revoked certificates, and is not necessarily information in form of a list as long as it can contain similar information. The information management device 102 generates a Bloom filter from the revocation list and distributes the generated Bloom filter to the authentication device 101. Moreover, when an examination request inquiring whether or not a certificate has been revoked is received from the authentication device 101, the information management device 102 uses the revocation list to determine whether or not the certificate has been revoked, and returns an examination result indicating that the certificate has been revoked or not. Hereinafter, the information management device 102 will be described in detail using FIG. 2.

Figure 2:
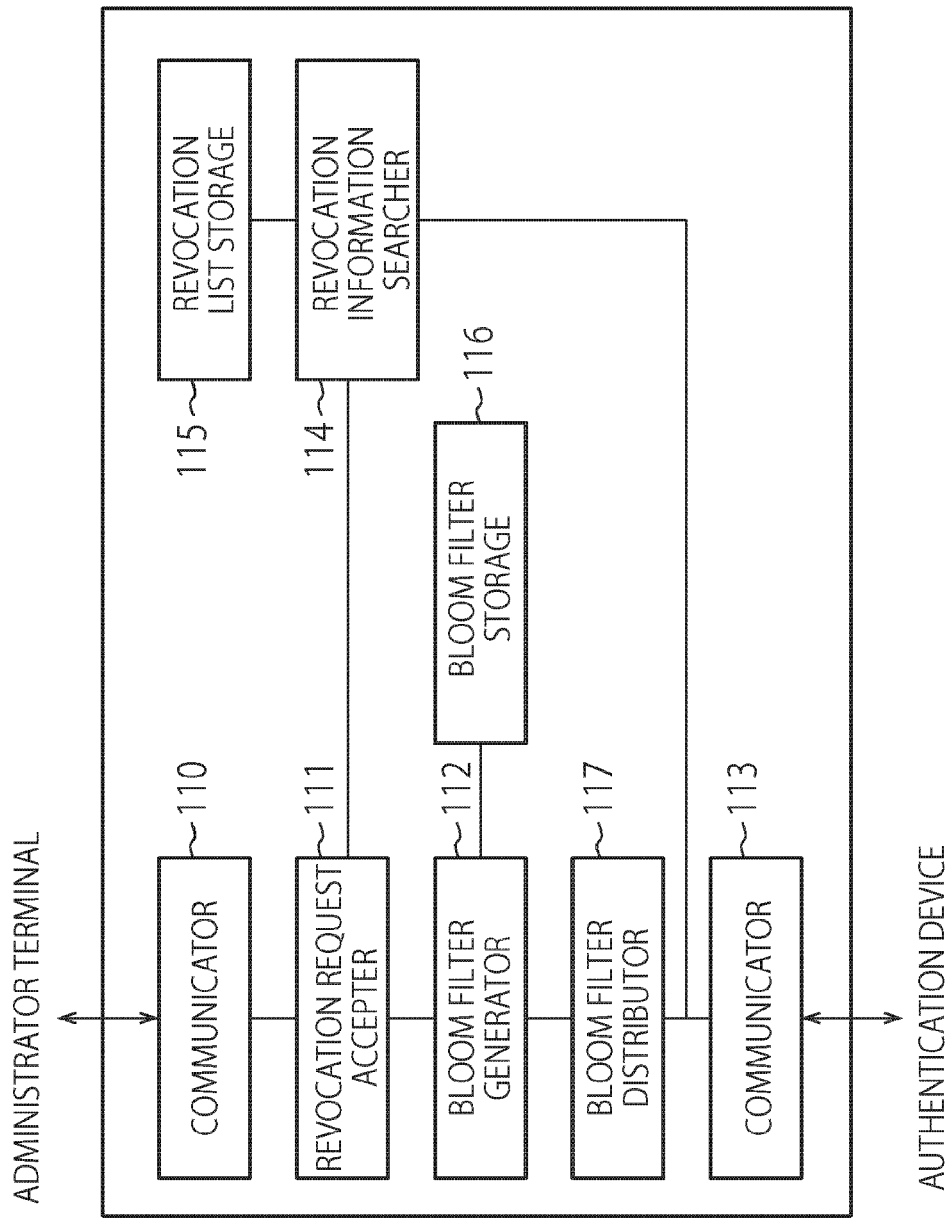
FIG. 2 is a block diagram of an example of an information management device according to the embodiment.

FIG. 2 is a block diagram of the information management device 102 according to the present embodiment. The information management device 102 includes a communicator 110, a revocation request accepter 111, a Bloom filter generator 112, a communicator 113, a revocation information searcher (examiner) 114, a revocation list storage 115, a Bloom filter storage 116, and a Bloom filter distributor 117.

Each of these elements can be configured by using a processor, such as CPU, or a circuit. A function of each element of the information management device 102 may be implemented by causing a computer to read a recording medium (for example, HDD, SSD, memory device, CD-R, CD-RW, DVD-RAM, DVD-R, or the like) storing programs to be executed by the processor, and to execute the programs. Moreover, each element may include a buffer such as memory. The memory may be a volatile memory such as DRAM or SRAM, or may be a nonvolatile memory such as NAND, FRAM or MRAM. Furthermore, the present device may include a storage device such as a hard disk device or SSD.

The communicator 110 communicates with the administrator terminal 104 through a network. The communicator 113 communicates with the authentication device 101 through a network. When the networks are the same one, the communicators 110 and 113 may be integrated into a single communicator.

The revocation request accepter 111 receives a revocation request from the administrator terminal 104 via the communicator 110. The revocation request accepter 111 authenticates the revocation request to check that the revocation request is not a request from an unintended third party. For example, the authentication is performed based on a signature added to the revocation request and a public key. When the authentication succeeds, the revocation request accepter 111 accepts the revocation request. Thus, the revocation request accepter 111 revokes a certificate designated by the revocation request. The revocation request accepter 111 provides information on the revoked certificate to the revocation information searcher 114 and the Bloom filter generator 112. Revocation of a certificate means that the revocation request accepter 111 accepts a revocation request concerning a certificate designated by the administrator to be revoked.

The revocation information searcher 114 manages the information on the certificate provided by the revocation request accepter 111 in form of a list. A list for managing information on certificates is referred to as a revocation list. All certificates may be collectively managed by using a single list, or may be managed by dividing the certificates into groups based on serial numbers thereof. In the latter case, the list can be updated and a revoked certificate can be searched, which will be described later, with less loads. As an example of the former case, assuming that certificates C1, C2 and C3 are revoked, the revocation list can be represented as L={C1, C2, C3}, where "C1" to "C3" represent information for specifying the respective certificates. Each time the revocation information searcher 114 receives information on a certificate from the revocation request accepter 111, the revocation information searcher 114 adds the information on the certificate to the revocation list. Certificates registered in the revocation list are treated as revoked (invalid). Conversely, certificates that are not registered in the revocation list are treated as valid.

The revocation list storage 115 stores the revocation list. For example, the revocation list storage 115 is configured by using any one or a combination of a nonvolatile storage device such as NAND flash memory, NOR flash memory, MRAM, ReRAM, hard disk, or optical disk, and a volatile storage device such as register, SRAM or DRAM.

The Bloom filter generator 112 generates a Bloom filter from the information on the certificate provided by the revocation request accepter 111, or from the revocation list, and stores the generated Bloom filter in the Bloom filter storage 116. For a second and subsequent times, a Bloom filter may be generated by updating the generated Bloom filter based on information on a certificate currently provided. Alternatively, each time the revocation list is updated, a Bloom filter can be generated (updated) by using information on all certificates registered in the revocation list or information on a certificate newly added to the revocation list. The Bloom filter generator 112 provides the Bloom filter (including a case of difference data between the Bloom filter and a previously generated Bloom filter) to the Bloom filter distributor 117.

The Bloom filter storage 116 stores the Bloom filter generated by the Bloom filter generator 112.

A method for generating a Bloom filter will be described. Information on a certificate is input to k hash functions to obtain respective hash values. In a Bloom filter, bits at positions indicated by the obtained hash values are set to 1. This is performed for all certificates to be registered in the Bloom filter. As a simple specific example, it is assumed that an initial Bloom filter has 10 bits "0000000000", and there are three (=k) hash functions, where the hash functions have a range of 0 to 9. Assuming that the values of the three hash functions computed for the certificate C1 are 1, 4 and 8, the first, fourth and eighth bits of the 10-bit Bloom filter are set to 1 to obtain "0100100010". Similarly, the certificate C2 is added to this Bloom filter. Assuming that the values of the three hash functions computed for the certificate C2 are 1, 5 and 6, the first, fifth and sixth bits of "0100100010" are set to 1 to obtain "0100111010".

The Bloom filter distributor 117 sends the Bloom filter received from the Bloom filter generator 112 to the authentication device 101 via the communicator 113. The Bloom filter distributor 117 may send only difference data from a previously sent Bloom filter (for example, only information indicating positions where bits have newly become 1). This case has an advantage that a communication load is lowered.

The revocation information searcher 114 receives an examination request inquiring whether or not a designated certificate has been revoked from the authentication device 101 via the communicator 113. Upon receiving the examination request, the revocation information searcher 114 searches the revocation list for the certificate designated by the examination request. When the designated certificate is included in the revocation list, it is determined that the designated certificate has been revoked. If the certificate is not included in the revocation list, it is determined that the designated certificate has not been revoked (is valid).

The revocation information searcher 114 returns an examination result indicating that the designated certificate has been revoked or not to the authentication device 101. A cache request for caching the examination result may be sent together to the authentication device 101.

The revocation information searcher 114 may send a cache request for caching information on all certificates registered in the revocation list to the authentication device 101. For timing of sending the cache request, the timing may be when a predetermined condition is met. For example, the timing may be when the revocation list is updated, or when information on a predetermined number of certificates is registered in the revocation list, or may be a predetermined cycle. The revocation information searcher 114 may send only information on a certificate added after previous transmission.

Moreover, the revocation information searcher 114 may send a cache request for caching an examination result about a certificate hitherto inquired by an examination request from another authentication device to the authentication device 101. Furthermore, the revocation information searcher 114 may send a cache request for caching information on a certificate hitherto inquired by an examination request from another authentication device, of information on all certificates registered in the revocation list, to the authentication device 101. For timing of sending the cache request, various variations are possible as in the above-described examples. The revocation information searcher 114 may store examination results about certificates hitherto inquired by examination requests, in association with identification information of source authentication devices of the examination requests, in the revocation list storage 115 or the Bloom filter storage 116, or alternatively any storage within the information management device 102 or an external storage accessible from the information management device 102.

Figure 3:
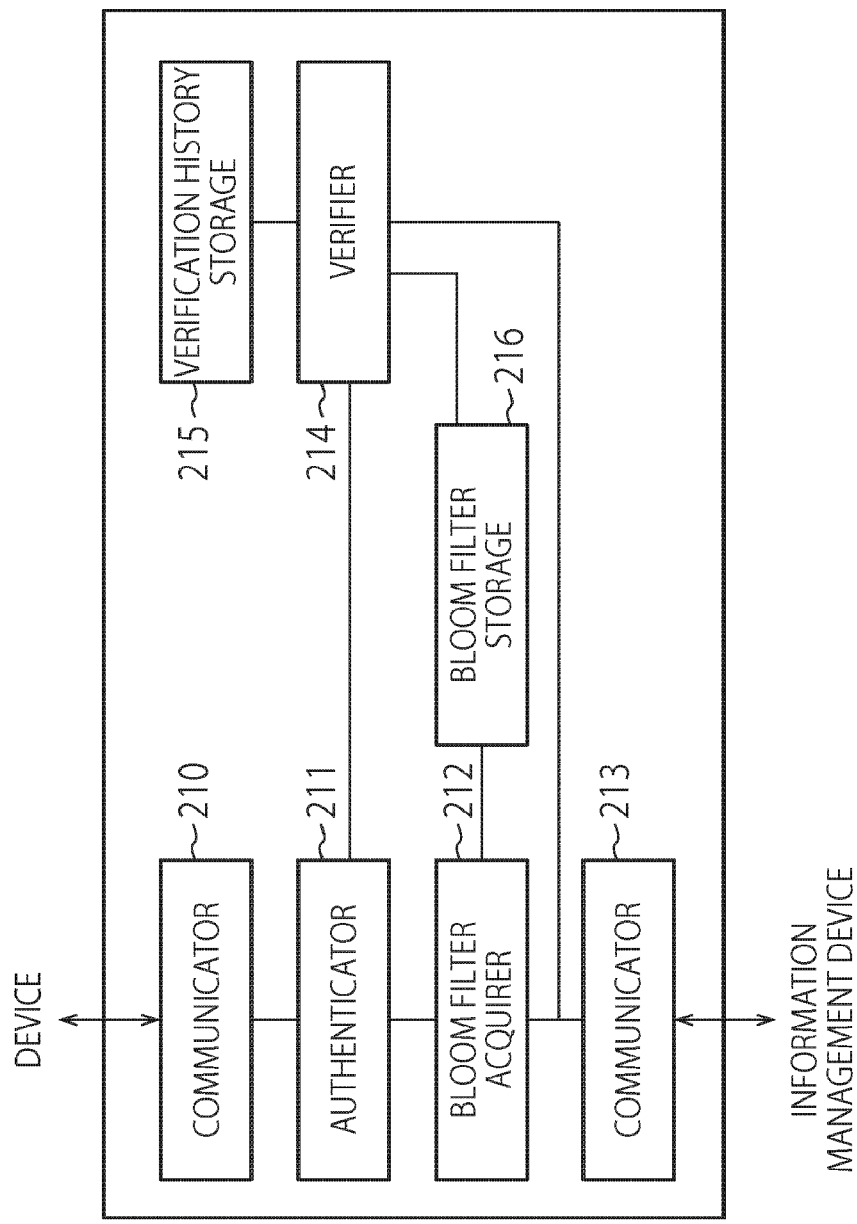
FIG. 3 is a block diagram of an example of an authentication device according to the embodiment.

FIG. 3 is a block diagram of the authentication device 101. The authentication device 101 includes a communicator 210, an authenticator 211, a Bloom filter acquirer 212, a communicator 213, a Bloom filter storage 216, a verifier 214, and a verification history storage 215.

Each of these elements can be configured by using a processor, such as CPU, or a circuit. Moreover, each element may include a buffer such as memory. A function of each element of the authentication device 101 may be implemented by causing a computer to read a recording medium (for example, HDD, SSD, memory device, CD-R, CD-RW, DVD-RAM, DVD-R, or the like) storing programs to be executed by the processor, and to execute the programs. The memory may be a volatile memory such as DRAM or SRAM, or may be a nonvolatile memory such as NAND, FRAM or MRAM. Furthermore, the present device may include a storage device such as a hard disk device or SSD.

The communicator 210 communicates with the devices 103A, 103B and 103C through a network. The communicator 213 communicates with the information management device 102 through a network. When the networks are the same one, the communicators 210 and 213 may be integrated into a single communicator.

The Bloom filter acquirer 212 receives a Bloom filter from the information management device 102 via the communicator 213 and stores the Bloom filter in the Bloom filter storage 216. For a second and subsequent receptions, the previously received Bloom filter is updated with a currently received Bloom filter (or difference data from the previous Bloom filter). The Bloom filter storage 216 stores the Bloom filter.

The authenticator 211 receives authentication requests concerning certificates from the devices 103A, 103B and 103C and authenticates the devices based on the certificates. Prior to the authentication, the authentication device 101 needs to verify validity of the certificates (whether or not the certificates have been revoked) received from the devices 103A, 103B and 103C. The authenticator 211 provides information on the received certificates to the verifier 214.

The verifier 214 verifies validity of the certificates by using the Bloom filter stored in the Bloom filter storage 216. As an example, the verification using the Bloom filter is performed as follows.

Information on a certificate to be verified is input to k hash functions (the same hash functions that are used by the information management device 102 to generate the Bloom filter) to obtain respective hash values. In the Bloom filter, if at least one of bits at positions indicated by the obtained hash values is 0, a verification result is a negative. In this case, it is determined that the certificate has not been revoked (is valid).

In the Bloom filter, if all of bits at positions indicated by the obtained hash values are 1, a verification result is a positive. In case of a positive, it is determined in principle that the certificate has been revoked. However, a false positive is possible in which a verification result is a positive even though the certificate has actually not been revoked. Accordingly, the certificate has not always been revoked even if a verification result with the Bloom filter is a positive. Therefore, when a verification result is a positive, it is necessary to check whether or not the verification result is a false positive.

Figures 4, 5:
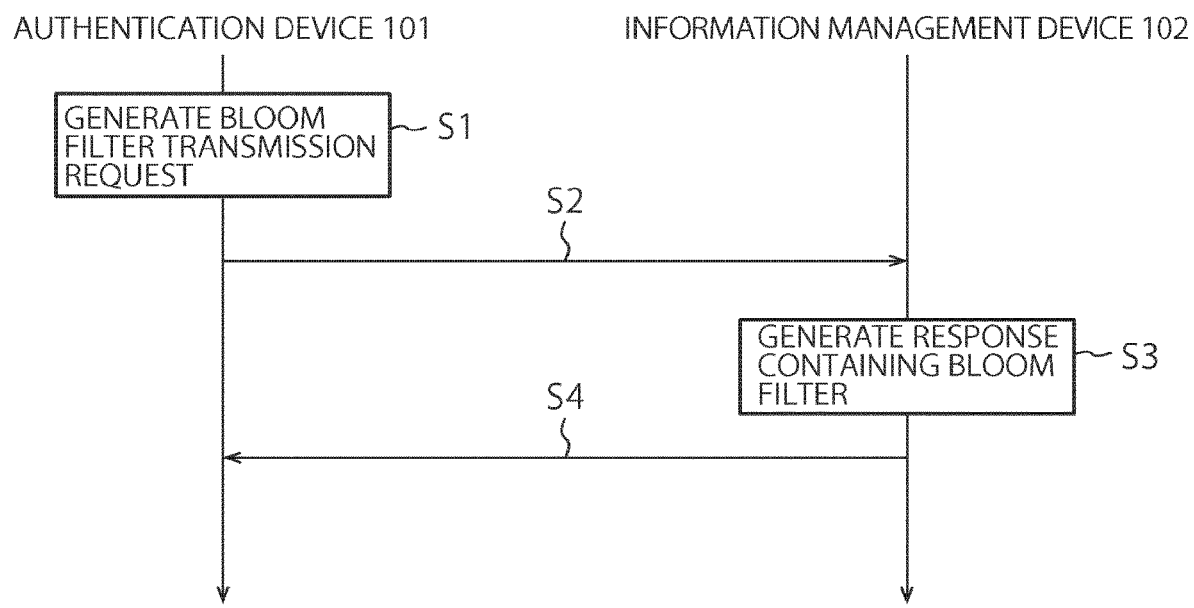
FIG. 4 is a diagram showing an example of a verification history according to the embodiment.
FIG. 5 is a sequence diagram according to the embodiment when a Bloom filter is sent by using a pull-type scheme.

When a verification result is a positive, the verifier 214 examines whether or not validity (revoked or not) of a certificate to be verified is registered in a verification history stored in the verification history storage 215. Information indicating validity of a certificate, which is provided by the information management device 102, is contained in the verification history. As an example, recorded in the verification history is a verification result (revoked or not) about a certificate whose validity was inquired of the information management device 102 by the authentication device 101 in the past, a certificate registered in the revocation list of the information management device 102, a certificate whose validity was inquired of the information management device 102 by another authentication device, or the like. FIG. 4 depicts an example of the verification history. This example shows that certificates C1 and C31 have been revoked and certificates C9 and C71 are valid.

If a certificate determined to be a positive is registered in the verification history, the verifier 214 identifies a verification result corresponding to the certificate in the verification history and, based on the identified verification result, determines whether or not the certificate has been revoked. When the identified verification result indicates "revoked", it is determined that the certificate has been revoked. When the identified verification result indicates "valid", it is determined that the certificate is valid (that is, the verification result is a false positive).

If a certificate determined to be a positive is not registered in the verification history, the verifier 214 sends an examination request inquiring whether or not the certificate has actually been revoked to the information management device 102 via the communicator 213.

The verifier 214 receives a response including an examination result from the information management device 102. When the examination result indicates that the certificate has not been revoked, the verifier 214 determines that the certificate has not been revoked and sends a notification to that effect to the authenticator 211. In that case, the authenticator 211 authenticates the source device of the authentication request by using the certificate and sends a response including an authentication result (succeed or fail) to the device. The authentication is performed, for example, based on a signature added to the certificate and a public key.

If the examination result indicates that the certificate has been revoked, the verifier 214 determines that the certificate has been revoked and sends a notification to that effect to the authenticator 211. In that case, the authenticator 211 sends a response indicating that the certificate has been revoked to the source device of the authentication request.

Concerning the certificate verified, the verifier 214 may add the examination result received from the information management device 102 to the verification history in the verification history storage 215. The addition may be performed only when a cache request is received from the information management device 102. For a next and subsequent times, when an authentication request is received concerning the same certificate, validity of this certificate can be determined based on the verification history, and therefore an inquiry to the information management device 102 can be eliminated. The frequency of an inquiry to the information management device 102 can be reduced by caching information on validity of a certificate in the verification history storage 215 as described above. Further, if a plurality of the authentication devices 101 exist, a verification history of one of the authentication devices 101 may be shared with the other authentication device or devices. In this case, the frequency of an inquiry to the information management device 102 can be reduced, compared to a case of the gross frequency.

(Bloom Filter Distribution Method)

A Bloom filter distribution method by the Bloom filter distributor 117 will be described. The Bloom filter distribution method has a plurality of schemes.

One of the schemes is a method (pull type) in which the information management device 102 receives a Bloom filter transmission request from the authentication device 101 and distributes a Bloom filter in response to the request. In another method (push type), the information management device 102 voluntarily sends a Bloom filter when a change occurs in the Bloom filter. The other schemes include a method (search pull type) in which when an examination request is received from the authentication device 101, the information management device 102 checks a Bloom filter stored in the authentication device 101 and sends a Bloom filter if necessary, and the like. Hereinafter, each method will be described in detail.

FIG. 5 is a sequence diagram of operation in the pull-type method. The Bloom filter acquirer 212 of the authentication device 101 generates a Bloom filter transmission request (step S1) and sends the generated Bloom filter transmission request to the information management device 102 (step S2). The Bloom filter transmission request also contains identification information of the authentication device 101. The Bloom filter transmission request is passed on to the Bloom filter distributor 117 of the information management device 102. When the Bloom filter distributor 117 confirms that the request is from the authentication device 101 based on the authentication device identification information contained in the Bloom filter transmission request, the Bloom filter distributor 117 reads a Bloom filter out of the Bloom filter storage 116 and generates a response containing the Bloom filter (step S3). The Bloom filter distributor 117 sends the generated response to the authentication device 101 (step S4).

In case of using the push type, when a Bloom filter in the Bloom filter storage 116 is changed (updated), the Bloom filter distributor 117 sends the Bloom filter to the authentication device 101. For sending the Bloom filter, a protocol based on a Publish/Subscribe model, in which a transmission side asynchronously sends a message, can be used. For a condition to determine that a Bloom filter is updated, an addition of information on a certificate to a Bloom filter, or a change in bits of a Bloom filter from the Bloom filter as of previous transmission may be used. Alternatively, a change in the number of certificates added to a Bloom filter may be used. A changed Bloom filter may be sent each time a change occurs to the Bloom filter, or a Bloom filter may be sent each time the number of changes reaches a predetermined value.

In case of using the search pull type, a function of managing a version number of a Bloom filter is provided to the Bloom filter distributor 117. More specifically, when a Bloom filter is updated, the Bloom filter distributor 117 increments the version number of the Bloom filter. The version number may be incremented each time the Bloom filter is updated, or each time a predetermined number of updates are made. When sending an examination request to the information management device 102, the authentication device 101 sends the version number of a Bloom filter currently used along with the examination request. The Bloom filter distributor 117 of the information management device 102 compares the version number of the Bloom filter used by the authentication device 101 with the version number of the Bloom filter managed by the Bloom filter distributor 117. When the version numbers of the Bloom filters differ, the Bloom filter distributor 117 stores the Bloom filter of the information management device 102 in a response to the above-mentioned examination request, which is generated by the revocation information searcher 114, and sends the response to the authentication device 101. The Bloom filter may always be contained in the response when the version numbers of the Bloom filters differ, or the Bloom filter may be contained in the response only when a difference between the version numbers of the Bloom filters is a predetermined value or more.

Figure 6:
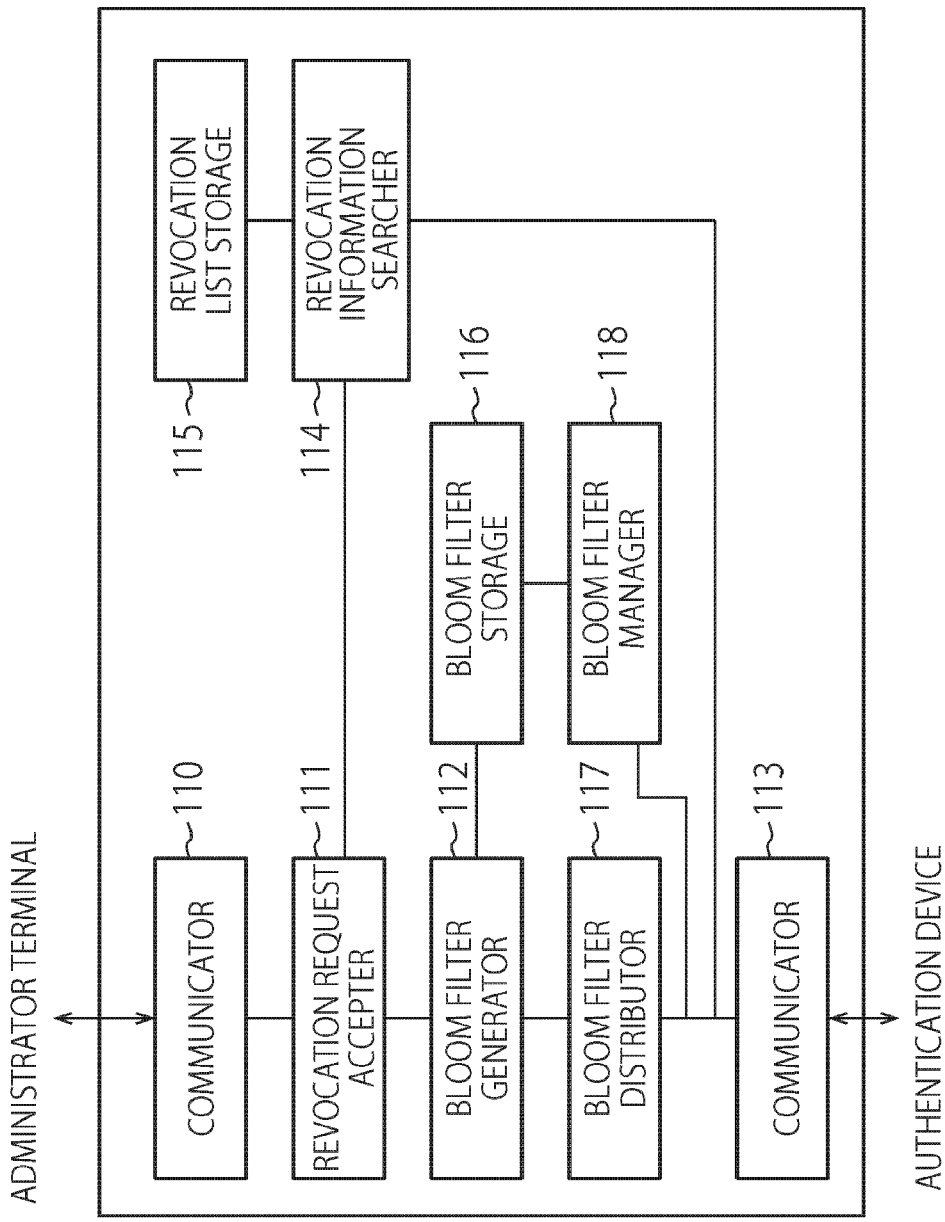
FIG. 6 is a block diagram of another example of the information management device according to the embodiment.

FIG. 6 shows an extended example of the information management device 102 of FIG. 2. A Bloom filter manager 118 is added to the information management device 102 of FIG. 2. The Bloom filter manager 118 manages a plurality of Bloom filters. As an example, the Bloom filter manager 118 uses a scalable Bloom filter to manage a plurality of Bloom filters. The Bloom filter manager 118 can be configured by using a processor, such as CPU, or a circuit. Moreover, the Bloom filter manager 118 may include a buffer such as memory.

An example of the scalable Bloom filter will be described. When a revocation request is received, a probability of occurrence of a false positive (false positive rate) in case of adding information on a certificate designated by the revocation request to a Bloom filter is computed. As an example, the false positive rate can be computed as $(1-(1-1/m)^{kn})^k$, where "k" is the number of hash functions, "m" is the number of bits of the Bloom filter, and "n" is the number of elements (the number of certificates) registered in the Bloom filter. If the false positive rate does not exceed a preset threshold, the Bloom filter generator 112 adds the information on the certificate to the Bloom filter. If the false positive rate exceeds the preset threshold, a new Bloom filter is generated based on the information on the certificate, and for a next and subsequent revocation requests, a certificate is added to the new Bloom filter. Similarly thereafter, a Bloom filter is added each time the false positive rate exceeds the threshold. In verification, as an example, it is determined that a verification result is a negative when all Bloom filters result in negatives, and it is determined that a verification result is a positive (including a false positive) when any one of the Bloom filters results in a positive.

As another example of using a plurality of Bloom filters, a possible method is that, for example, a plurality of Bloom filters with different terms of validity are prepared, and a certificate whose expiration date falls within the validity period of a Bloom filter is added to this Bloom filter. Combining the scalable Bloom filter scheme with this method, it is also possible that a Bloom filter with a new validity period is added when the false positive rate exceeds the threshold. The scheme for managing a plurality of Bloom filters is not limited to the methods described here.

The Bloom filter manager 118 sets an expiration date on a Bloom filter generated (including updated) by the Bloom filter generator 112. The Bloom filter manager 118 manages the Bloom filters and expiration dates thereof in association with each other.

The Bloom filter manager 118 may set a Bloom filter expiration date by giving a validity period with a preset length of time (a first example of setting a Bloom filter expiration date), or may determine a Bloom filter expiration date based on the expiration date of a certificate registered in a Bloom filter (a second example of setting a Bloom filter expiration date).

(Specific Example of the First Example of Setting a Bloom Filter Expiration Date)

For example, it is predetermined that the validity period of a Bloom filter is one year. Then, a date after one year from the date a Bloom filter is newly generated (added) is the expiration date of the Bloom filter. The expiration date of a Bloom filter once determined is not changed in midstream. It may be determined to which Bloom filter a revoked certificate is added, based on the validity period of the revoked certificate.

For example, if the validity period of a Bloom filter is from Jan. 1, 2017 to Jan. 1, 2018, only certificates whose expiration dates fall within a period from Jan. 1, 2017 to Jan. 1, 2018 are added to the Bloom filter. On Jan. 2, 2018, the Bloom filter manager 118 initializes, or discards, the Bloom filter. "Initialize" means that all bits of the Bloom filter are set to 0, that is, all certificates registered in the Bloom filter are discarded.

(Specific Example of the Second Example of Setting a Bloom Filter Expiration Date)

When a new certificate is added to a Bloom filter, the expiration date of the Bloom filter and the expiration date of the certificate are compared. If the expiration date of the certificate is later, the expiration date of the Bloom filter is updated with the expiration date of the certificate. If the expiration date of the Bloom filter is later, the expiration date of the Bloom filter is not updated.

For example, it is assumed that information on a certificate whose validity period is from Feb. 1, 2017 to Feb. 1, 2018 is added to a Bloom filter whose expiration date is Jan. 1, 2018. In this case, since the expiration date of the certificate, Feb. 1, 2018, is later than the expiration date of the Bloom filter, Jan. 1, 2018, the expiration date of the Bloom filter is updated with the expiration date of the certificate. On the other hand, it is assumed that information on a certificate whose validity period is from Dec. 1, 2016 to Dec. 1, 2017 is added to the same Bloom filter. In this case, since the expiration date of the certificate, Dec. 1, 2017, is earlier than the expiration date of the Bloom filter, Jan. 1, 2018, the expiration date of the Bloom filter is not updated and remains as Jan. 1, 2018.

The Bloom filter manager 118 manages each Bloom filter, the expiration date thereof and the like in the Bloom filter storage 116. FIG. 7 shows an example of a table in case of managing the Bloom filters and the expiration dates thereof in the above-described second example of setting a Bloom filter expiration date. The plurality of Bloom filters (BF1, BF2, BF3, . . . ) and the respective terms of validity of the Bloom filters are registered. The validity period of each Bloom filter coincides with the validity period of a latest certificate registered in the Bloom filter. That is, the expiration date of each Bloom filter coincides with the expiration date of a latest certificate registered in the Bloom filter. The Bloom filter distributor 117 sends information on the Bloom filters and the respective expiration dates thereof to the authentication device 101.

The authentication device 101 manages the plurality of Bloom filters and the respective expiration dates thereof in association with each other in the Bloom filter storage 216. When an authentication request is received from a device, the authentication device 101 selects a Bloom filter whose expiration date is later than the expiration date of a certificate designated by the authentication request, and performs verification using the selected Bloom filter. When a plurality of Bloom filters are applicable to this condition, the authentication device 101 may select the plurality of Bloom filters and perform verification using each of the selected Bloom filters. When all of the Bloom filters used in the verification result in negatives, it is determined that a verification result is a negative. Otherwise, it is determined that a verification result is a positive. In case of a positive, it is necessary to examine whether or not the verification result is a false positive, as described above. Operation in this case is as described already, and therefore a description thereof is omitted. The verification history storage 215 may store a verification history as shown in FIG. 4 for each Bloom filter.

The Bloom filter manager 118 of the information management device 102 checks the Bloom filter expiration dates of the plurality of Bloom filters. If there is a Bloom filter passing the Bloom filter expiration date, the Bloom filter is initialized or discarded. The initialization is to set all bits to 0. The Bloom filter expiration dates may be checked at a predetermined interval or when the number of Bloom filters exceeds a predetermined value.

Upon initializing a Bloom filter, the Bloom filter manager 118 sends an initialization notice concerning the Bloom filter to the authentication device 101 via the communicator 113. The Bloom filter manager 118 may send an initialization notice each time initialization is performed or when the number of initialized Bloom filters exceeds a predetermined value. Upon receiving the initialization notice, the authentication device 101 initializes or discards the Bloom filter. Similarly to the information management device 102, the authentication device 101 may check the Bloom filter expiration dates and initialize or discard a Bloom filter. In this case, the initialization notice from the information management device 102 can be omitted.

Figure 8:
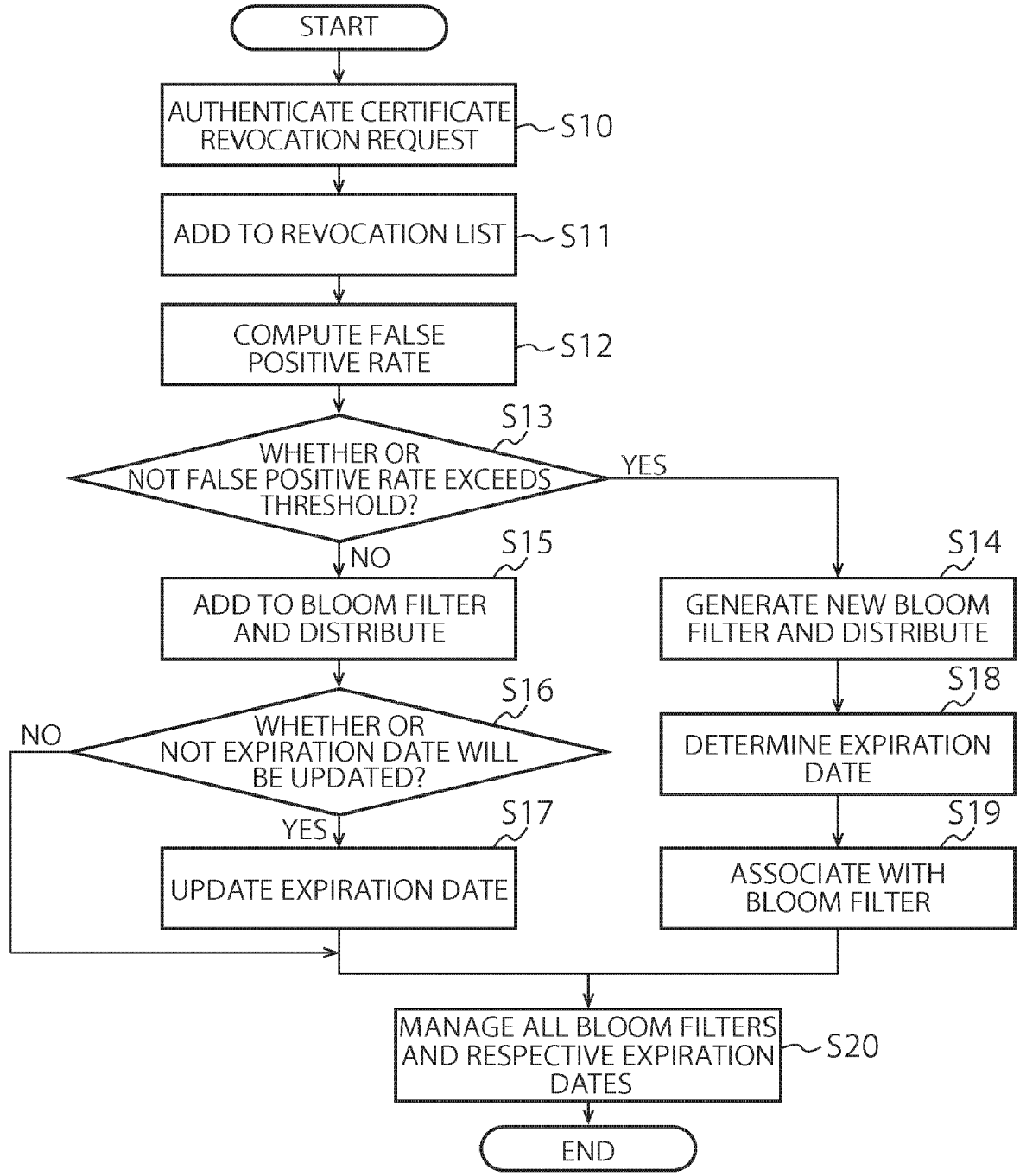
FIG. 8 is a flowchart showing an example of operation at time of receiving a new revocation request according to the embodiment.

FIG. 8 is a flowchart showing an example of operation when the information management device 102 receives a revocation request from the administrator terminal 104. Order of steps in the flowchart is an example, and some steps can be permutated unless a contradiction arises in operation. For example, steps S11 and S12 can be interchanged.

In the information management device 102, the revocation request accepter 111 receives a revocation request from the administrator terminal 104 and authenticates legitimacy of the received revocation request (step S10). Upon confirming that the received revocation request is legitimate (that is, one received from the administrator terminal 104), the revocation request accepter 111 revokes a certificate designated by the revocation request and passes information on the revoked certificate to the Bloom filter generator 112 and the revocation information searcher 114.

The revocation information searcher 114 adds the information on the revoked certificate to the revocation list (step S11).

The Bloom filter generator 112 computes a false positive rate in case of adding the certificate designated by the revocation request to a Bloom filter (step S12). The Bloom filter generator 112 determines whether or not the false positive rate exceeds a threshold (step S13). If the false positive rate exceeds the threshold (YES), the Bloom filter generator 112 does not add the certificate to the Bloom filter and generates a new Bloom filter based on the information on the certificate (step S14). The Bloom filter distributor 117 distributes the newly generated Bloom filter (step S14). If the false positive rate does not exceed the threshold (NO), the Bloom filter generator 112 adds the information on the certificate to the Bloom filter (step S15). The Bloom filter distributor 117 delivers the Bloom filter to which the information on the certificate is added (step S15).

In the distribution of the Bloom filter in step S14 or step S15, any of the above-described transmission schemes such as pull type, push type and search pull type may be used. Computing a difference between the Bloom filter and a previously sent Bloom filter, only difference data may be sent instead of sending the Bloom filter. In the present embodiment, transmission of a Bloom filter includes transmission of difference data.

When the Bloom filter is updated in step S15, the Bloom filter manager 118 determines whether or not it is necessary to update the expiration date of the Bloom filter (step S16). For the determination of whether or not to update, the above-described method may be used. When it is determined that an update is necessary (YES), the Bloom filter manager 118 updates the Bloom filter expiration date (step S17). For example, the Bloom filter expiration date is updated with the expiration date of the certificate added to the Bloom filter. The updated Bloom filter expiration date may be sent to the authentication device 101. When it is determined that an update is not necessary (NO), the process goes to step S20.

Moreover, when a new Bloom filter is generated in step S14, the Bloom filter manager 118 determines a Bloom filter expiration date (step S18). The Bloom filter manager 118 associates the determined Bloom filter expiration date with the Bloom filter (step S19). The determined Bloom filter expiration date may be sent to the authentication device 101.

The Bloom filter manager 118 manages all Bloom filters and the respective Bloom filter expiration dates thereof (step S20).

Figure 9:
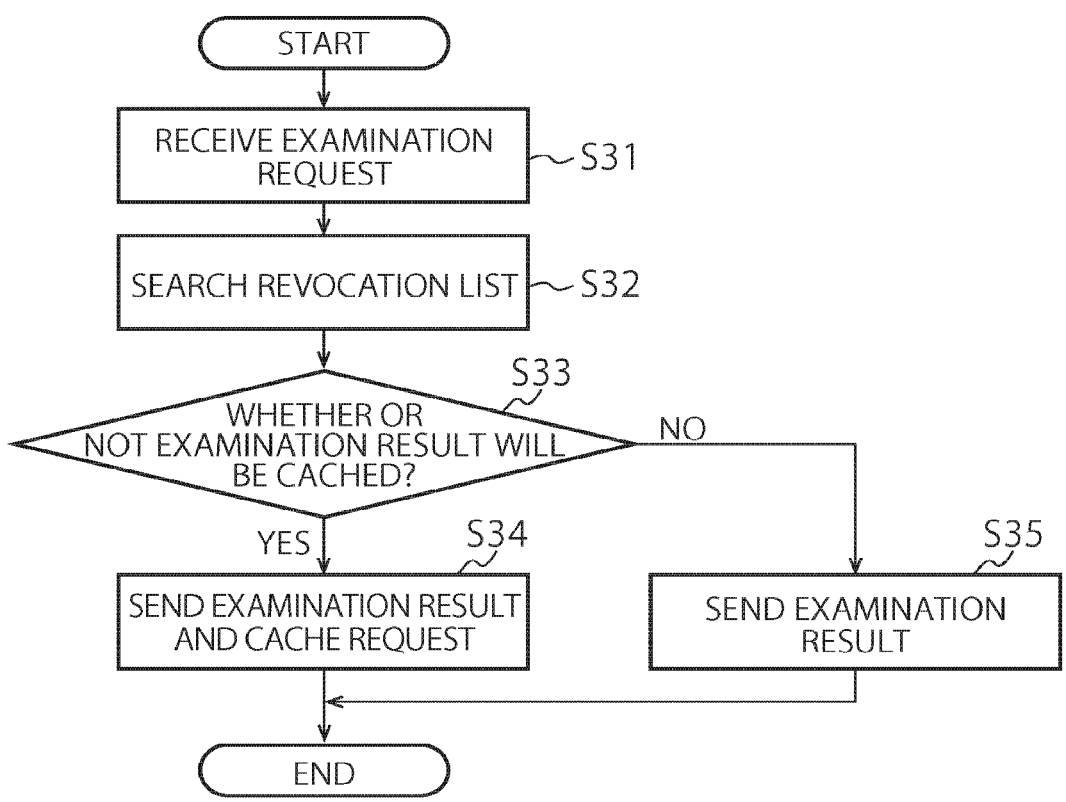
FIG. 9 is a flowchart showing an example of operation at time of receiving an examination request according to the embodiment.

FIG. 9 is a flowchart showing an example of operation when the information management device 102 receives an examination request from the authentication device 101.

The revocation information searcher 114 receives an examination request from the authentication device 101 (step S31). The revocation information searcher 114 searches the revocation list to check whether or not information on a certificate designated by the examination request is contained (step S32). If the search finds a hit, that is, if the information on the certificate is contained, the revocation information searcher 114 determines that the certificate has been revoked. If the search finds no hit, that is, if the information on the certificate is not contained, the revocation information searcher 114 determines that the certificate has not been revoked. The revocation information searcher 114 determines whether or not to allow the authentication device 101 to cache an examination result indicating that the certificate has been revoked or not as an examination history (step S33). For the determination, an arbitrary condition may be used. For example, the revocation information searcher 114 may always determine to allow the authentication device 101 to cache, or may determine to allow the authentication device 101 to cache once every multiple examination requests received, or at random. When the revocation information searcher 114 determines to allow the authentication device 101 to cache an examination result (YES), the revocation information searcher 114 sends the examination result and a cache request to the authentication device 101 (step S34). When the revocation information searcher 114 determines not to allow the authentication device 101 to cache an examination result (NO), the revocation information searcher 114 sends only the examination result (step S35).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information management device, comprising:
   processing circuitry configured to
      generate a plurality of Bloom filters based on information on certificates revoked before expiration dates of the certificates expire;
      set expiration dates on the Bloom filters in accordance with a timing at which the Bloom filters are generated;

send the Bloom filters to an authentication device, the authentication device being configured to authenticate a device with a certificate provided by the device; and receive an examination request designating a certificate from the authentication device and examine whether the certificate designated by the examination request is revoked based on revocation management information containing information on certificates revoked before expiration dates of the certificates, and to send a result indicating whether the designated certificate is revoked to the authentication device, wherein the processing circuitry is further configured to select a Bloom filter among the Bloom filters such that the expiration date of the Bloom filter is before an expiration date of the certificate revoked, and update the selected Bloom filter based on the certificate revoked.

2. The information management device according to claim 1, wherein the processing circuitry is further configured to send a cache request for caching the examination result, along with the examination result, to the authentication device.

3. The information management device according to claim 1, wherein the processing circuitry is further configured to send the information on the certificate contained in the revocation management information and a cache request for caching the information on the certificate contained in the revocation management information to the authentication device.

4. The information management device according to claim 1, wherein the processing circuitry is further configured to revoke a certificate before an expiration date of the certificate expires when a revocation request designating the certificate is received, and to store information on the revoked certificate in the revocation management information.

5. The information management device according to claim 1, wherein the processing circuitry is further configured to compute a probability of occurrence of a false positive in verification based on the Bloom filter and update the Bloom filter based on the information on the certificate designated by the examination request when the probability is not higher than a threshold, but newly generate a Bloom filter based on the information on the designated certificate when the probability is higher than the threshold, and the processing circuitry is further configured to send the newly generated Bloom filter to the authentication device.

6. The information management device according claim 1, wherein the processing circuitry is further configured to discard the Bloom filter passing the expiration date among the plurality of Bloom filters.

7. The information management device according to claim 1, further comprising:

a memory to store the plurality of Bloom filters and the revocation management information.

8. An information management system comprising:

an authentication device comprising first processing circuitry configured to authenticate a device with a certificate provided by the device; and an information management device comprising second processing circuitry configured to generate a plurality of Bloom filter based on information on certificates revoked before expiration dates of the certificates expire and send the Bloom filters to the authentication device;

the first processing circuitry of the authentication device is further configured to acquire the Bloom filters from the information management device, and verify, based on the Bloom filters, whether the certificate provided by the device is revoked, and when a verification result is positive, to send an examination request inquiring whether the certificate is revoked to the information management device, the second processing circuitry of the information management device is configured to receive an examination request designating a certificate from the authentication device, examine whether the certificate designated by the examination request is revoked based on revocation management information containing information on certificates revoked before expiration dates of the certificates, send a result indicating whether the designated certificate is revoked to the authentication device, wherein the second processing circuitry is further configured to select a Bloom filter among the Bloom filters such that the expiration date of the Bloom filter is before an expiration date of the certificate revoked, and update the selected Bloom filter based on the certificate revoked.

9. An information management method performed by a computer, comprising:

generating a plurality of Bloom filters based on information on certificates revoked before expiration dates of the certificates expire;

setting expiration dates on the Bloom filters in accordance with timing at which the Bloom filters are generated;

sending the Bloom filters to an authentication device, the authentication device being configured to authenticate a device with a certificate provided by the device; and receiving an examination request designating a certificate from the authentication device and examine whether the certificate designated by the examination request is revoked based on revocation management information containing information on certificates revoked before expiration dates of the certificates, and sending a result indicating whether the designated certificate is revoked to the authentication device, wherein the method further includes selecting a Bloom filter among the Bloom filters such that the expiration date of the Bloom filter is before an expiration date of the certificate revoked, and updating the selected Bloom filter based on the certificate revoked before the expiration date.

10. A non-transitory computer readable medium having a computer program stored therein which, when executed by a computer, causes the computer to perform a method, comprising:

generating a plurality of Bloom filters based on information on certificates revoked before expiration dates of the certificates expire;

setting expiration dates on the Bloom filters in accordance with timing at which the Bloom filters are generated;

sending the Bloom filters to an authentication device, the authentication device being configured to authenticate a device with a certificate provided by the device; and receiving an examination request designating a certificate from the authentication device and examine whether the certificate designated by the examination request is revoked based on revocation management information containing information on certificates revoked before expiration dates of the certificates, and sending a result indicating whether the designated certificate is revoked to the authentication device, wherein the method further includes selecting a Bloom filter among the Bloom filters such that the expiration date of the Bloom filter is before an expiration date of the certificate revoked, and updating the selected Bloom filter based on the certificate revoked before the expiration date.

* * * * *